(12) United States Patent
Omar et al.

(10) Patent No.: US 10,749,579 B1
(45) Date of Patent: Aug. 18, 2020

(54) METHOD AND SYSTEM FOR IMPROVING THE SPECTRAL EFFICIENCY OF LINE-OF-SIGHT (LOS) MULTIPLE-INPUT MULTIPLE-OUTPUT (MIMO) COMMUNICATION SYSTEMS

(71) Applicant: HUAWEI TECHNOLOGIES CO., LTD., Shenzhen, Guangdong (CN)

(72) Inventors: Hassan Omar, Kanata (CA); Ming Jian, Kanata (CA); Nadia Jamal, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/527,637

(22) Filed: Jul. 31, 2019

(51) Int. Cl.
*H04B 7/0456* (2017.01)
*H04B 7/06* (2006.01)
*H04B 7/0426* (2017.01)
*H04W 52/24* (2009.01)
*H04B 17/336* (2015.01)

(52) U.S. Cl.
CPC ......... *H04B 7/043* (2013.01); *H04B 7/0478* (2013.01); *H04B 7/0486* (2013.01); *H04B 17/336* (2015.01); *H04W 52/241* (2013.01)

(58) Field of Classification Search
CPC .... H04B 7/061; H04B 7/0617; H04B 7/0634; H04B 7/0639; H04B 7/0663; H04B 7/0456; H04B 7/0482; H04B 7/0673; H04W 16/28; H04L 25/0246
See application file for complete search history.

(56) References Cited

U.S. PATENT DOCUMENTS

| | | | | |
|---|---|---|---|---|
| 2016/0013850 A1* | 1/2016 | Zhou | ................... | H04B 7/0404 375/267 |
| 2017/0085358 A1* | 3/2017 | Huberman | ........... | H04B 7/0456 |
| 2019/0182793 A1* | 6/2019 | Wang | ................... | G01S 13/765 |
| 2019/0260444 A1* | 8/2019 | Hauzner | .............. | H04B 7/0617 |
| 2019/0260613 A1* | 8/2019 | Lee | ...................... | H04L 25/0248 |
| 2019/0312623 A1* | 10/2019 | Park | ....................... | H04L 5/0051 |

* cited by examiner

*Primary Examiner* — Aristocratis Fotakis
(74) *Attorney, Agent, or Firm* — BCF LLP

(57) ABSTRACT

The disclosed systems, methods, and structures are directed to LoS MIMO communications that optimize spectral efficiency and include a precoding module to multiply an input transmit data vector with a precoding matrix to generate a precoded transmit data vector, a gain matrix calculation module to generate a gain matrix having optimal gain values that maximize the spectral efficiency, a transmit signal processing unit to convert the precoded transmit data vector into an analog signal, a receive signal processing unit to receive the analog signal and convert the analog signal into a receive data vector, an equalization module, a channel estimation module to estimate channel information to generate an estimated channel, and a singular value decomposition module to decompose the estimated channel matrix. The gain matrix calculation module calculates the optimal gain values of the gain matrix by maximizing an objective function encompassing the channel information provided by a fed-back diagonal matrix.

20 Claims, 10 Drawing Sheets

$$U^*\underline{y} = \Sigma\underline{x} + U^*\underline{n} \implies U^*\underline{y} = U^*[H(P\underline{x}) + \underline{n}] = U^*U\Sigma V^*[V(G\underline{x})] + U^*\underline{n} = \Sigma G\underline{x} + \underline{n}'$$

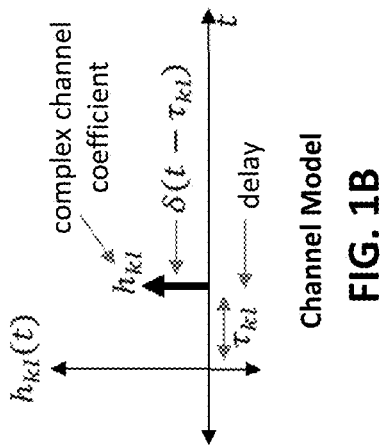
FIG. 1B
Channel Model
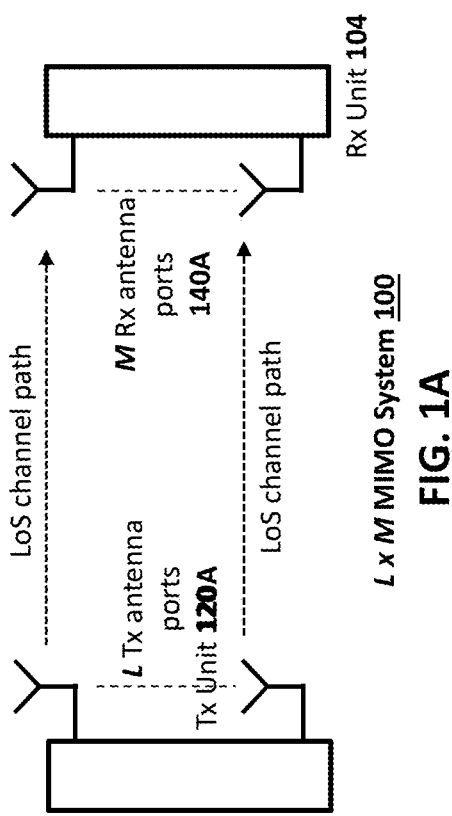
FIG. 1A
$L \times M$ MIMO System 100
FIG. 1C
System Model $$\underline{y} = U\Sigma V^*(V\underline{x}) + \underline{n}$$

Tx Precoding

FIG. 1D

$$U^*\underline{y} = \Sigma \underline{x} + U^*\underline{n}$$

Rx Equalization

FIG. 1E

Singular Values of Channel Matrix $H$ $$\Sigma = \begin{bmatrix} 4.4408 & 0 & 0 & 0 & 0 & 0 & 0 & 0 \\ 0 & 3.4347 & 0 & 0 & 0 & 0 & 0 & 0 \\ 0 & 0 & 0.0447 & 0 & 0 & 0 & 0 & 0 \\ 0 & 0 & 0 & 0.0447 & 0 & 0 & 0 & 0 \\ 0 & 0 & 0 & 0 & 0.0337 & 0 & 0 & 0 \\ 0 & 0 & 0 & 0 & 0 & 0.0337 & 0 & 0 \\ 0 & 0 & 0 & 0 & 0 & 0 & 0.0004 & 0 \\ 0 & 0 & 0 & 0 & 0 & 0 & 0 & 0.0004 \end{bmatrix}$$

FIG. 1F

$$\max_{\underline{p}} f(\underline{p}) \text{ where: concave function } f_{CNV}(\underline{p}) = \sum_{i=1}^{r} \log_2\left(1 + \frac{\sigma_i^2 p_i}{N}\right), \quad C_i = (2^B - 1)\frac{N}{\sigma_i^2}$$

$$\max_{\underline{p}} f(\underline{p}) \quad \text{where:} \quad \text{LUT function} \quad f_{NON\_CNV}(\underline{p}) = \sum_{i=1}^{r} f_{LUT}\left(\frac{\sigma_i^2 p_i}{N}\right), \quad C_i = 10^{K/10} \frac{N}{\sigma_i^2}$$

METHOD AND SYSTEM FOR IMPROVING THE SPECTRAL EFFICIENCY OF LINE-OF-SIGHT (LOS) MULTIPLE-INPUT MULTIPLE-OUTPUT (MIMO) COMMUNICATION SYSTEMS

CROSS-REFERENCE TO RELATED APPLICATIONS

This is the first application filed for the instantly disclosed technology.

FIELD OF THE INVENTION

The present invention generally relates to the field of wireless communications and, in particular, to a precoding and optimized gain scheme to improve the spectral efficiency of line-of-sight wireless communication systems.

BACKGROUND

In an effort to address the growing market need for additional wireless services and related applications, future wireless communication standards (e.g., 5G networks) propose requirements that substantially increase the channel traffic capacity of wireless networks.

In recent years, multiple-input multiple-output (MIMO)-based communication systems have been implemented to accommodate and reliably support higher data rates and increased data streams for contemporary demands. However, the increase of channel traffic capacity, as required by the future standards, presents certain challenges to wireless networks, including MIMO-based communication systems.

For example, based on channel characteristics in addition to MIMO-based system parameters, such as, for example, carrier frequency, distance between transmitter and receiver sites, and distances among antenna elements of the transmit/receive antenna arrays, over time, the channel matrix may become ill-conditioned. That is, the channel matrix may have singular values with very small magnitudes in comparison to other singular values. Such an ill-conditioned channel matrix results in a significant degradation of the spectral efficiency of MIMO-based systems.

SUMMARY

An object of the present disclosure is directed to a line-of-sight (LoS) multi-input multi-output (MIMO) communication system having an optimized spectral efficiency. The MIMO system includes a transmitter unit with a precoding module configured to multiply an input baseband transmit data vector with a precoding matrix to generate a precoded transmit data vector, a gain matrix calculation module operative to generate a gain matrix having optimal gain values that maximize the spectral efficiency of the system based on provided channel information, and a transmit signal processing unit operative to convert the precoded transmit data vector into an analog signal and transmit the analog signal. The MIMO system further includes a receiver unit with a receive signal processing unit operative to receive the transmitted analog signal and convert the received analog signal into a baseband receive data vector, an equalization module having a channel estimation module configured to estimate the channel information based on the baseband receive data vector and to generate an estimated channel matrix indicative of the channel information, and a singular value decomposition module configured to decompose the estimated channel matrix into a first unitary matrix, a second unitary matrix, and a rectangular diagonal matrix having diagonal terms that correspond to the singular values of the estimated channel matrix.

The MIMO system also provides that the baseband receive data vector is multiplied with the first unitary matrix to generate an equalized receive vector, the second unitary matrix is fed-back to the precoding module, and the diagonal matrix is fed-back to the gain matrix calculation module, that a digital signal processing unit operative to process the equalized receive vector to generate an estimated data vector representative of the input baseband transmit data vector, that the gain matrix calculation module calculates the optimal gain values of the gain matrix by maximizing an objective function encompassing the channel information provided by the fed-back diagonal matrix, and that the gain matrix is multiplied with the fed-back second unitary matrix to produce the precoding matrix.

Additional aspects of the MIMO system provide that the objective function that is maximized is a concave function or a lookup table-based nonconcave function.

Another object of the present disclosure is directed to a method of optimizing the spectral efficiency of a line-of-sight (LoS) multi-input multi-output (MIMO) communication system. The method includes multiplying, via a precoding module, an input baseband transmit data vector with a precoding matrix to generate a precoded transmit data vector, generating, via a gain matrix calculation module, a gain matrix having optimal gain values based on provided channel information, converting the precoded transmit data vector into an analog signal and transmitting the analog signal. The method further includes receiving the transmitted analog signal and converting the received analog signal into a baseband receive data vector, performing equalization processing on the baseband receive data vector comprising estimating the channel information based on the baseband receive data vector and generating an estimated channel matrix indicative of the channel information, applying singular value decomposition operations to decompose the estimated channel matrix into a first unitary matrix, a second unitary matrix, and a rectangular diagonal matrix having diagonal terms that correspond to the singular values of the estimated channel matrix, multiplying the baseband receive data vector with the first unitary matrix to generate an equalized receive vector, feeding-back the second unitary matrix to the precoding module, and feeding-back the diagonal matrix to the gain matrix calculation module, and a digital signal processing unit operative to process the equalized receive vector to generate an estimated data vector representative of the input baseband transmit data vector.

The method also provides that the gain matrix calculation module calculates the optimal gain values of the gain matrix by maximizing an objective function encompassing the channel information provided by the fed-back diagonal matrix, and that the gain matrix is multiplied with the fed-back second unitary matrix to produce the precoding matrix.

Additional aspects of the method provide that the objective function that is maximized is a concave function or a lookup table-based nonconcave function.

BRIEF DESCRIPTION OF THE FIGURES

The features and advantages of the present disclosure will become apparent from the following detailed description, taken in combination with the appended drawings, in which:

FIG. 1A depicts a high-level functional block diagram of a conventional LoS L×M MIMO-based system;

FIG. 1B graphically depicts an exemplary channel model associated with the conventional system;

FIG. 1C depicts a mathematical model representation of the conventional system;

FIG. 1D depicts a mathematical representation of transmitter precoding operations of the conventional system;

FIG. 1E depicts a mathematical representation that models receiver equalization operations of the conventional system;

FIG. 1F depicts a rectangular diagonal matrix indicating singular value entries of a channel matrix for the conventional system;

Figure 2:
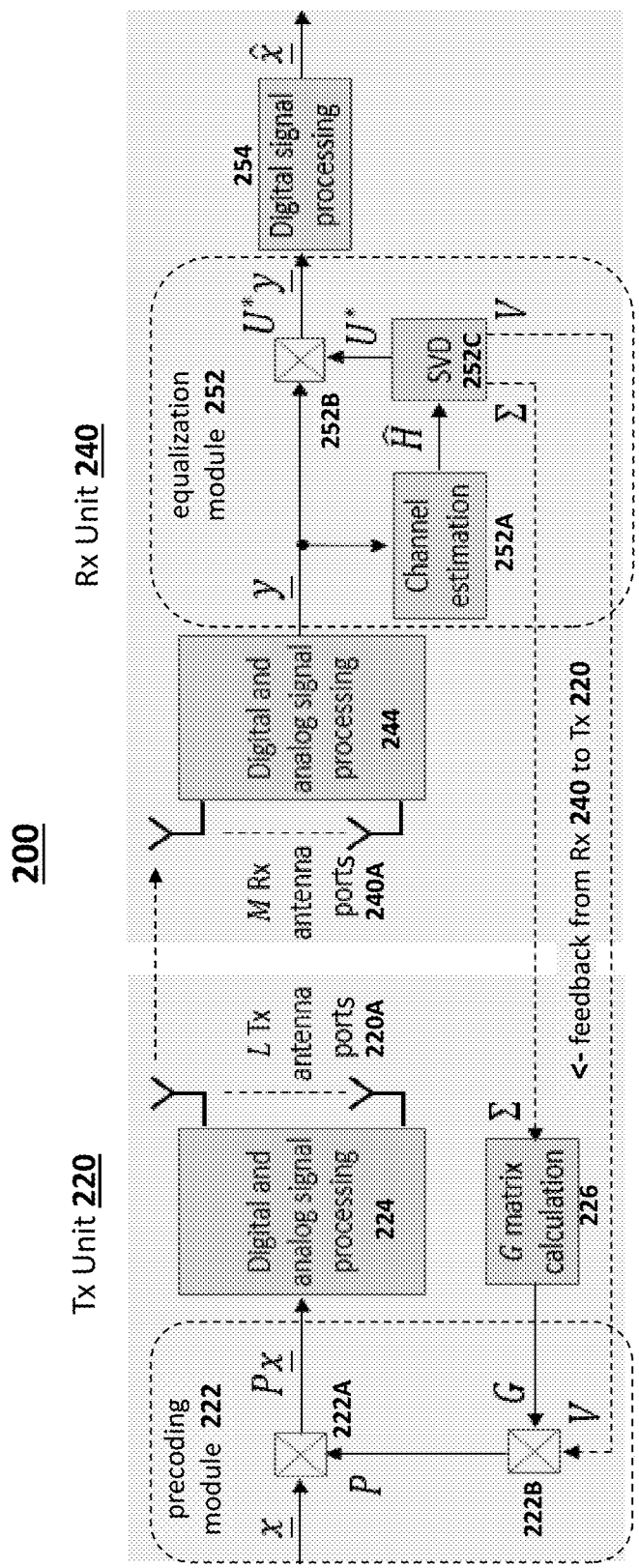
FIG. 2 depicts a functional block diagram of a MIMO-based system architecture, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments pertain.

The disclosed embodiments are directed to improving the spectral efficiency of wireless communications systems having line-of-sight (LoS) arrangements between transmit and receive antenna arrays, such as, for example, MIMO-based systems.

By way of background, FIG. 1A illustrates a functional block diagram of a conventional LoS L×M MIMO-based system 100. As shown, L×M MIMO system 100 includes a transmitter unit 120 comprising L transmit antenna ports 120A and a receiver unit 140 comprising M receive antenna ports 140A. Transmitter unit 120A and receiver unit 140A are arranged to be within a LoS channel path, in which transmitter unit 120 operates to simultaneously transmit different encoded, analog, data-bearing signal streams via the L transmit antenna ports 120A. In turn, receiver unit 140 operates to simultaneously receive the transmitted data-bearing signal streams conveyed across the LoS channel path, via the M receive antenna ports 140A.

It will be understood that transmitter unit 120 and receiver unit 140 may incorporate a variety of components and processes to perform mapping, digital-to analog conversion, modulation, analog-to-digital conversion, demodulation, equalization, etc. operations. However, for tractability purposes and simplicity, these components and processes are not illustrated or described, as they are well known in conventional practice.

FIG. 1B graphically depicts an exemplary channel model associated with the conventional LoS L×M MIMO-based system 100. As shown, the channel model represents the channel impulse response between the $l^{th}$ transmit antenna port and $k^{th}$ receive antenna port, indicated by a complex channel coefficient value $h_{kl}$ and a delay $\tau_{kl}$.

FIG. 1C illustrates a mathematical model representation of conventional L×M MIMO system 100, as follows:

$$\underline{y}=H\underline{x}+\underline{n}=U\Sigma V^*\underline{x}+\underline{n}$$

where: $\underline{y}$ represents a baseband received data vector;
$\underline{x}$ represents a baseband transmitted data vector;
$\underline{n}$ represents a noise vector;
H represents a channel matrix having a rank r;
U, V represent unitary matrices;
$U^*$, $V^*$ represent the conjugate transpose of matrices U, V
$\Sigma$ represents a rectangular diagonal matrix with diagonal elements indicating the
singular values of the H matrix; and
$U\Sigma V^*$ represents the singular value decomposition (SVD) of the H matrix.

The non-zero singular values of the H matrix are denoted by $\sigma_i$, i=1, . . . , r. And, as indicated, channel matrix H may be characterized as the multiplication of three matrices U, $\Sigma$, $V^*$ (i.e., $U\Sigma V^*$) by virtue of singular value decomposition (SVD).

FIG. 1D illustrates a mathematical representation of transmitter 120 precoding operations of L×M MIMO system 100, as follows:

$$\underline{y}=U\Sigma V^*(V\underline{x})+\underline{n}$$

FIG. 1E illustrates a mathematical representation that models the receiver 140 equalization operations of conventional L×M MIMO system 100. The receiver 140 equalization model may be characterized as follows:

$$U^*\underline{y}=\Sigma\underline{x}+U^*\underline{n}$$

FIG. 1F depicts a rectangular diagonal matrix Σ indicating singular value entries of channel matrix H for a conventional 8×8 MIMO system 100. As shown, the magnitudes of singular values along the diagonal of matrix Σ vary substantially (e.g., ranging from 4.5645 to 0.0003). Consequently, a transmit vector element that is multiplied by a small singular value of channel matrix H experiences a very low gain, thus reducing the modulation order that can be supported by the corresponding input data stream.

On the other hand, an input data stream corresponding to a transmit vector element that is multiplied by a large singular value of channel matrix H experiences a very high gain. Such a high gain may not be able to support a modulation order that is higher than a prescribed limit (e.g., 4096-QAM in implemented MIMO-based systems), due to its effect on other system parameters (e.g., phase noise). Hence, significant variances in the singular values of channel matrix H demonstrate an ill-conditioned channel matrix that results in the degradation of the spectral efficiency of MIMO-based systems.

The disclosed embodiments are directed to improving the spectral efficiency of LoS MIMO-based systems, by increasing the gain for input data streams corresponding to the small singular values of channel matrix H at the expense of decreasing the gain for the input data streams corresponding to the large singular values of channel matrix H. In this manner, limitations on the supportable highest modulation orders of the input data streams are taken into account to optimize spectrum use while also maintaining the average of the total power radiated by the transmit antennas at a constant level.

To this end, FIG. 2 illustrates a functional block diagram of LoS L×M MIMO-based system architecture 200, in accordance with various embodiments of the present disclosure. MIMO-based system 200 comprises a transmitter unit 220 and receiver unit 240. As shown, transmitter unit 220 comprises precoding module 222, transmitter signal processing unit 224, G matrix calculation module 226, and L transmit antenna ports 220A. In turn, receiver unit 240 comprises M receive antenna ports 240A, receiver signal processing unit 244, equalization module 252, and digital signal processing unit 254. Equalization module 252 incorporates a channel estimation module 252A and SVD module 252C.

In operation, transmitter unit 220 is supplied with an input digital data stream comprising baseband transmit data vector $\underline{x}$. The transmit vector $\underline{x}$ is supplied to precoding module 222, which performs a matrix multiplication operation of vector $\underline{x}$ with precoding matrix P, via matrix multiplier 222A, to generate precoded transmit vector $P\underline{x}$. As shown, precoding matrix P is the result of the matrix multiplication operation, via matrix multiplier 222B, of unitary matrix V and calculated diagonal matrix G (i.e., P=VG), both of which are based on V and Σ matrix information fed-back from the equalization module 252 of receiver unit 240.

That is, as noted above, unitary matrix V and rectangular diagonal matrix Σ representing singular values of channel matrix H may be derived by applying an SVD operation to channel matrix H, namely, UΣV*. As will be described in detail below, system 200 operates to feedback the values of matrices V and Σ computed by equalization module 252 to transmitter unit 220 to generate a precoding matrix P that is applied to transmit vector $\underline{x}$.

Returning to FIG. 2, pre-coded transmit vector $P\underline{x}$ is forwarded to transmitter signal processing unit 224 which, in accordance with known methods, is configured to perform a variety of transmission-related operations, such as, for example, digital-to analog conversion, modulation, frequency up-conversion, filtering, etc. After these processing operations, L transmit antenna ports 220A radiatively transmit analog signals along the LoS channel path directed to receiver unit 240.

As depicted, the transmitted radiated signals are received by the M receive antenna ports 240A of receiver unit 240. The received analog signals are then supplied to receiver signal processing unit 244 which, in accordance with known methods, is configured to perform a variety of receiver-related processes, such as, for example, frequency down-conversion, demodulation, analog-to-digital conversion, filtering operations, etc. to generate baseband received data vector $\underline{y}$ that is forwarded to equalization module 252.

In particular, received data vector $\underline{y}$ is supplied to channel estimation module 252A of equalization module 252. In accordance with known methods, such as, for example, periodic transmission of a channel estimation sequence, channel estimation module 252A operates to generate matrix $\hat{H}$ that provides an estimation of each entry of channel matrix H based on received data vector $\underline{y}$. The estimated channel matrix $\hat{H}$ is subsequently forwarded to SVD module 252C which, as noted above, operates to perform the singular value decomposition (SVD) of $\hat{H}$ to produce the following constituent matrices: unitary matrix U (and counterpart conjugate transpose matrix U*), unitary V (and counterpart conjugate transpose matrix V*), and rectangular diagonal matrix Σ containing the singular values of matrix $\hat{H}$.

As shown, SVD module 252C forwards the unitary conjugate matrix U* to matrix multiplier 252B to perform the multiplication of matrix U* with received data vector $\underline{y}$ to render equalized receive vector $U^*\underline{y}$. The equalized receive vector $U^*\underline{y}$ is subsequently forwarded to digital signal processing unit 254 that may employ known digital processing techniques to extract an estimated $\hat{x}$ vector that accurately represents an estimation of the transmitted baseband digital data vector $\underline{x}$.

In addition, SVD module 252C feeds the V and Σ matrices back to transmitter unit 220. Specifically, unitary matrix V is fed-back to precoding module 222 while rectangular diagonal matrix Σ is fed-back to G matrix calculation module 226. G matrix calculation module 226 is configured to produce a diagonal matrix G having gain values that optimize the spectral efficiency of system 200. As described in detail below, the optimized gain values determined by calculation module 226 are based on rectangular matrix Σ that identifies along diagonal entries the estimated singular values of channel matrix H, obtained by performing SVD of the estimated channel matrix $\hat{H}$.

As discussed above, equalized receive vector $U^*\underline{y}$ is generally expressed as:

$$U^*\underline{y}=\Sigma\underline{x}+U^*\underline{n}$$

However, by virtue of precoding module 222 operations that produce pre-coded transmit vector $P\underline{x}$ at the transmitter unit 220 side, along with the SVD of $\hat{H}$ that generates the U*, V, and Σ matrices, $U^*\underline{y}$ may be further expressed as:

$$U^*\underline{y}=U^*[H(P\underline{x})+\underline{n}]=U^*U\Sigma V^*[V(G\underline{x})]+U^*\underline{n}=\Sigma G\underline{x}+\underline{n}'$$

Therefore, equalized transmit vector $U^*\underline{y}$ may be represented by the multiplication of Σ, G matrices, and transmit vector $\underline{x}$ in addition to a noise component $\underline{n}'$.

Moreover, as discussed above, G matrix calculation module 226 generates matrix G having diagonal entries representing gain values that optimize the spectral efficiency of system 200, based on the estimated singular values of channel matrix $\hat{H}$ provided by matrix Σ. Due to practical considerations and system specifications, the calculation of the optimal gain values is subjected to the following constraints: (a) the determined optimal gain values do not affect the total power transmitted by all of antenna ports 220A (i.e., the average of the total radiated power is maintained substantially constant); and (b) the determined optimal gain values are limited by the highest modulation order that can be supported for each input data stream $\underline{x}$. These constraints serve to optimally increase the gain for input data streams exhibiting smaller channel matrix singular values at the expense of decreasing the gain for input data streams corresponding to larger singular values.

The determination of the optimal gain values, provided by G matrix calculation module 226, may be modeled as the following maximization problem:

$$\max_{\underline{p}} f(\underline{p}) \quad (1a)$$

where: $f(\underline{p})$ represents an objective function;
max represents the maximization of $f(\underline{p})$; and
$\underline{p}=[p_1, p_2, \ldots p_r]$ is a decision vector, in which decision variable $p_i$ represents the square of the $i^{th}$ diagonal element of the G matrix;

The maximization of objective function $f(\underline{p})$ is subject to the following practical/operational constraints:

$$\sum_{i=1}^{r} p_i = T; \quad (1b)$$

$$p_i \leq C_i, \forall i; \quad (1c)$$

$$p_i \geq 0, \forall i; \quad (1d)$$

where:

$$\sum_{i=1}^{r} p_i = T$$

represents the limitation on the average of the total transmit power T radiated by all antennas when the $\underline{p}$ vector is employed by precoding module 222;

$p_i \leq C_i, \forall i$ represents the limitation on $p_i$ by a constant $C_i$ related to the minimum signal-to-noise ratio (SNR) of a received data stream required to support the highest modulation order; and $p_i \geq 0, \forall i$ represents the limitation that $\underline{p}$ vector contains non-negative values.

In view of this modeling framework (i.e., equations (1a)-(1d)), objective function $f(\underline{p})$ may be defined as a mathematical concave function, in accordance with various embodiments of the present disclosure, as follows:

$$f_{CNV}(\underline{p}) = \sum_{i=1}^{r} \log_2\left(1 + \frac{\sigma_i^2 p_i}{N}\right), \quad (2)$$

where: $\sigma_i^2$ represents the $i^{th}$ non-zero singular value of channel matrix H;
N represents the average noise power; and $$\frac{\sigma_i^2 p_i}{N}$$

represents the SNR of the $i^{th}$ received data stream, when the $\underline{p}$ vector is employed by precoding module 222.

Moreover, in accordance with various embodiments of the present disclosure, the $C_i$ constant values related to the minimum SNR of a received data stream required to support the highest modulation order may be mathematically defined as follows:

$$C_i = (2^B - 1)\frac{N}{\sigma_i^2}, \quad (3)$$

where: B represents the number of bits per symbol for the highest supported modulation order.

It will be appreciated that the number of bits per symbol B is directly related to the highest supportable order for the modulation scheme applied to each input data stream, i.e., each element of the vector $\underline{x}$. For example, if the highest-order supportable modulation scheme for an input data stream is a 4K-QAM scheme, B would have a value of 12 bits per channel use (bpcu), $2^{B=12}=4096$.

Armed with mathematical definitions of concave function $f_{CNV}(\underline{p})$ and constants $C_i$ (equations (2), (3), respectively), along with the imposed constraints (equations (1b)-(1d)), the solutions that maximize concave function $f_{CNV}(\underline{p})$ (equation 1(a)) may be achieved through known numerical computational methods for solving a convex optimization problem. These solutions produce the optimal gain value entries of diagonal G matrix, which optimizes the spectral efficiency of system 200.

Figures 3A, 3B:
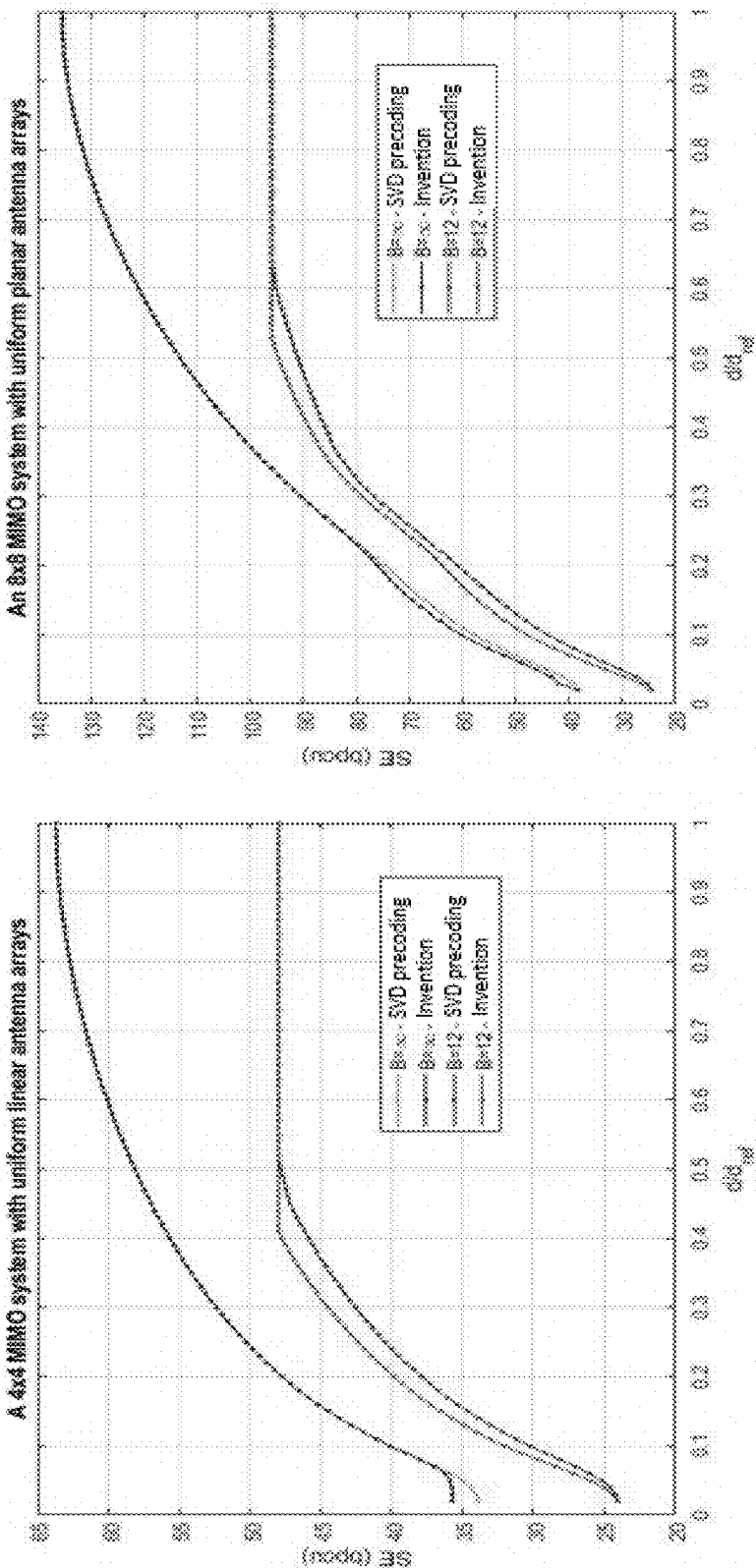
FIGS. 3A, 3B graphically depict spectral efficiency performance based on a concave objective function to generate optimal gain values for 4×4 and 8×8 MIMO-based systems, respectively, in accordance with various embodiments of the present disclosure.

In concert with the embodiments disclosed above, FIGS. 3A, 3B graphically depict the spectral efficiency performance of 4×4 and 8×8 LoS MIMO-based systems by implementing concave function $f_{CNV}(\underline{p})$ to generate the optimal gain values of the G matrix. The LoS MIMO-based systems operate at an SNR of 45 dB and respectively employ uniform linear antenna arrays and uniform planar antenna arrays. As shown, the achieved spectral efficiency values (in units of bits per channel use (bpcu)) may be represented as a function of the ratio $d/d_{ref}$:

where: d represents the antenna separation distance in the transmit antenna and receive antenna arrays;
$d_{ref}$ denotes a reference distance which is equal to $$\sqrt{\frac{D\lambda}{2}};$$

D represents the distance between the transmit antenna and receive antenna arrays; and
$\lambda$ represents the carrier wavelength.

It will be noted that the $d_{ref}$ value represents the optimal antenna separation distance for a 2×2 MIMO-based system employing uniform linear (and parallel) transmit and receive antenna arrays. Thus, as depicted by FIGS. 3A, 3B, the disclosed embodiments demonstrate an improvement in system efficiency when B=12. Stated differently, when $d=0.4 \, d_{ref}$, a spectral efficiency improvement of approximately 4% is achieved for both the 4×4 and 8×8 MIMO-based systems over a conventional SVD precoding scheme operating at the same SNR level. In contrast, when B=∞ (i.e., no limitation on the highest modulation order that can be supported), the disclosed embodiments do not result in any noticeable improvement over the spectral efficiency performance of the SVD precoding scheme.

In many implemented MIMO-systems, the spectral efficiency may not be determined based on a mathematical concave function (equation (2)), but on the use of a look-up table (LUT) having SNR ranges that are mapped to predefined spectral efficiency values. Therefore, in accordance with alternative embodiments of the present disclosure, the objective function $f(\underline{p})$ to be maximized may be represented as follows:

$$f_{NON\_CNV}(\underline{p}) = \sum_{i=1}^{r} f_{LUT}\left(\frac{\sigma_i^2 p_i}{N}\right), \quad (4)$$

where:

$$f_{LUT}\left(\frac{\sigma_i^2 p_i}{N}\right)$$

represents the LUT function providing predefined spectral efficiency values based on the SNR value $$\frac{\sigma_i^2 p_i}{N}.$$

Furthermore, in accordance with various embodiments of the present disclosure, the $C_i$ constant values related to the minimum SNR of a received data stream required to support the highest modulation order may be represented as follows:

$$C_i = 10^{K/10} \frac{N}{\sigma_i^2}, \quad (5)$$

where: K represents the minimum SNR value (in dB) necessary to achieve the maximum spectral efficiency calculated based on the LUT function $f_{LUT}(.)$ along with any required SNR back-off (BO) value; and $$\left(\frac{\sigma_i^2 C_i}{N}\right)$$

represents the maximum limit of SNR value for the $i^{th}$ received data stream.

It will be appreciated that, much like concave function $f_{CNV}(\underline{p})$ (equation (2)), $f_{NON\_CNV}(\underline{p})$ (equation (4)) is to be maximized in accordance with equation (1a) and subjected to the constraint conditions provided by equations (1b)-(1d). The solutions that maximize $f_{NON\_CNV}(\underline{p})$ may be achieved through known numerical computational methods for solving non-convex optimization problems. These solutions produce the optimal gain value entries of diagonal G matrix, which optimizes the spectral efficiency of system 200.

Figure 4A:
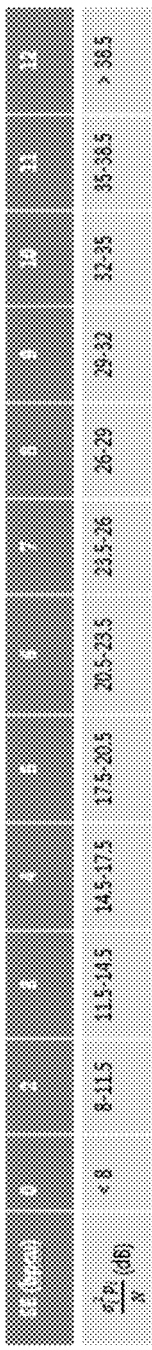
FIG. 4A depicts a representative spectral efficiency look-up table, in accordance with various embodiments of the present disclosure.

FIG. 4A depicts a representative spectral efficiency LUT 400, in accordance with the disclosed embodiments. As shown, LUT 400 comprises a row of multiple SNR value range categories, in which each SNR range category is associated with a corresponding spectral efficiency value (in bpcu). In the depicted embodiment, the K value for LUT 400 is 38.5 dB, which corresponds to a spectral efficiency of 12 bpcu. However, for LUT 400 with an additional 5.0 dB BO, the K value is equal to 43.5 dB, which is the sum of 5 dB BO and the minimum SNR value in LUT 400 required to achieve the maximum spectral efficiency, i.e., 38.5 dB.

Figure 4B:
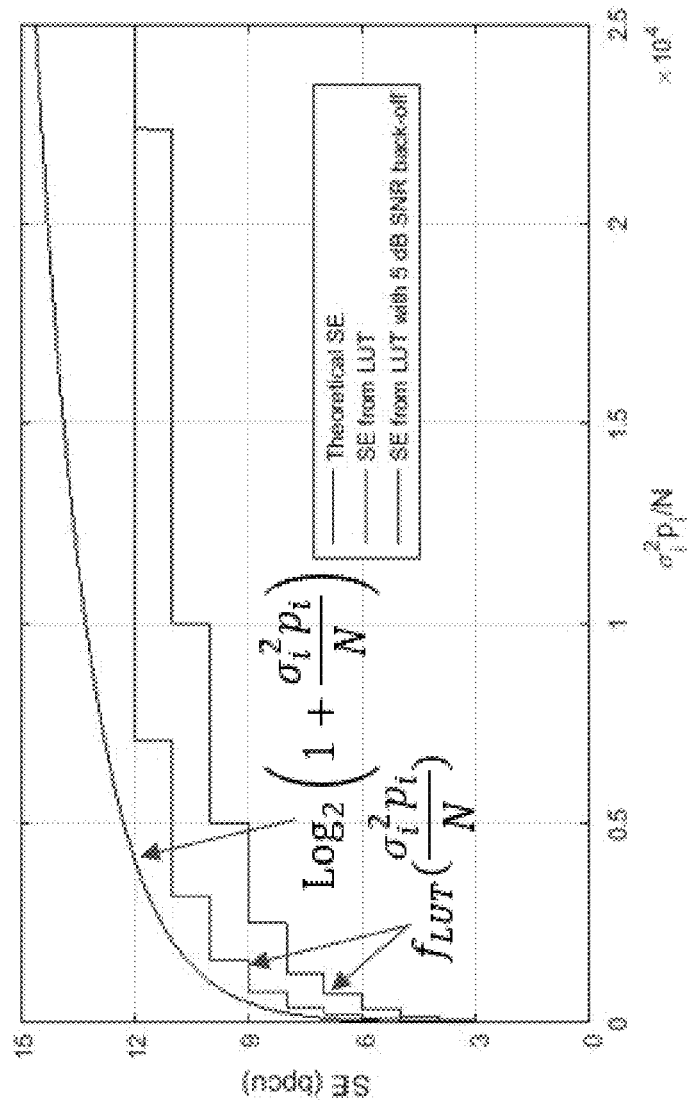
FIG. 4B graphically depicts a comparison of the spectral efficiency calculated based on a concave function and that calculated based on a look-up table function, in accordance with various embodiments of the present disclosure.

FIG. 4B illustrates a comparison of spectral efficiency provided by concave function $$\log_2\left(\frac{\sigma_i^2 p_i}{N}\right)$$

and non-concave function $$f_{LUT}\left(\frac{\sigma_i^2 p_i}{N}\right)$$

based on $$\left(\frac{\sigma_i^2 p_i}{N}\right)$$

values, in accordance with the disclosed embodiments. As shown, the function $$\log_2\left(\frac{\sigma_i^2 p_i}{N}\right)$$

is indicated by a smooth curve graph while the function $$f_{LUT}\left(\frac{\sigma_i^2 p_i}{N}\right)$$

is indicated by two staircase graphs, representing the spectral efficiencies calculated from LUT 400 with additional 0 dB and 5 dB SNR BO values.

Figure 4C:
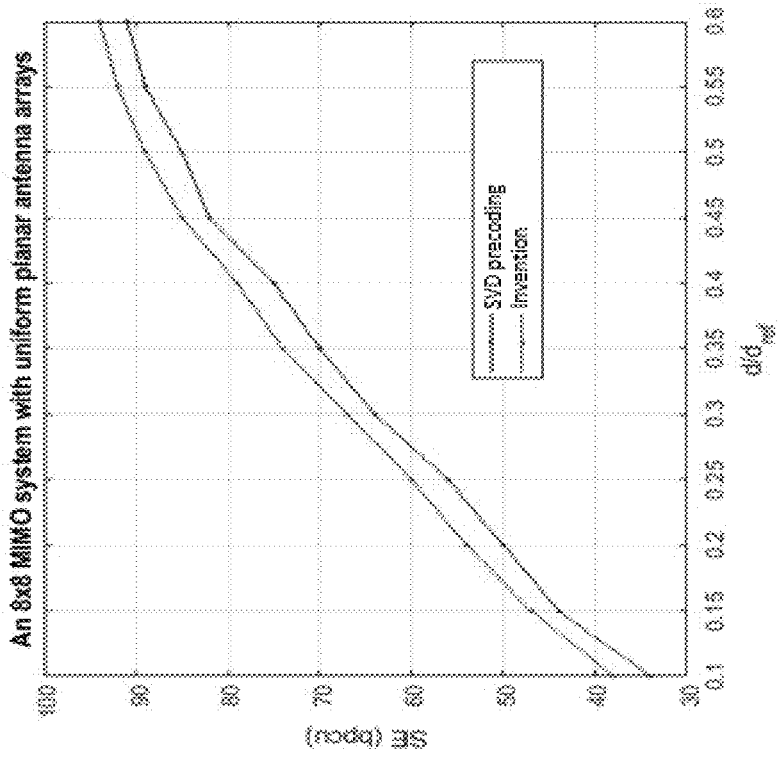
FIGS. 4C, 4D graphically depict spectral efficiency performance based on the look-up table function to generate optimal gain values for 4×4 and 8×8 MIMO-based systems, respectively, in accordance with various embodiments of the present disclosure.
Figure 4D:
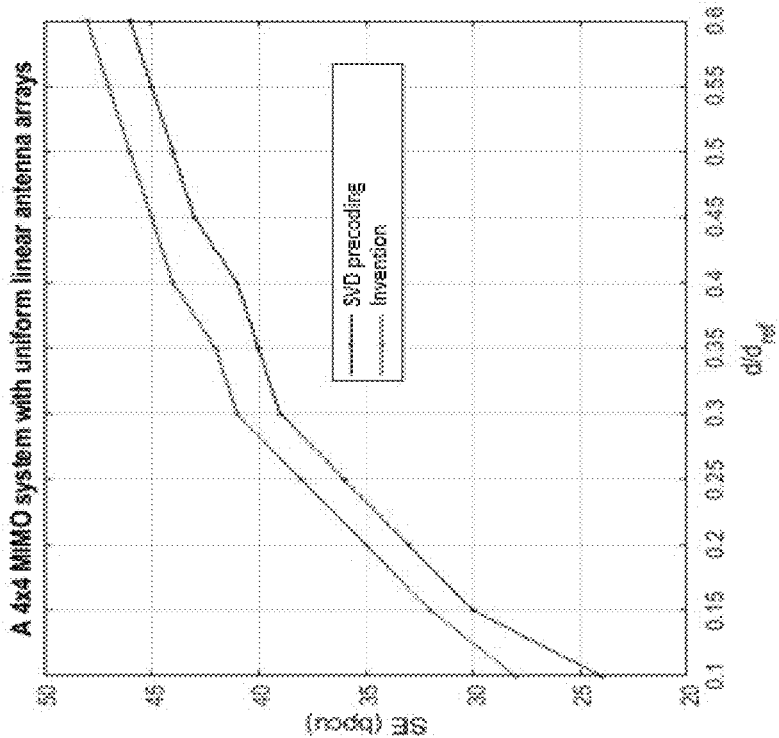

In concert with the embodiments disclosed above, FIGS. 4C, 4D graphically depict the spectral efficiency performance of 4×4 and 8×8 LoS MIMO-based systems in implementing function $f_{NON\_CNV}(\underline{p})$ to generate the optimal gain values of the G matrix. As noted above, relative to the descriptions of FIGS. 3A, 3B, each of the MIMO-based systems operate at an SNR of 45 dB with the maximum number of bits per symbol B=12 and respectively employ uniform linear antenna arrays and uniform planar antenna arrays. The spectral efficiency values (in bpcu) are represented as function of the ratio $d/d_{ref}$.

FIGS. 4C, 4D indicate that, by virtue of implementing look-up function $f_{LUT}(\ )$ to determine optimal gain values, when $d=0.4 d_{ref}$, the spectral efficiency for the 4×4 and 8×8 MIMO-based systems demonstrates an improvement over a conventional SVD precoding scheme by approximately 7.5% and 5.5%, respectively.

Figure 5B:
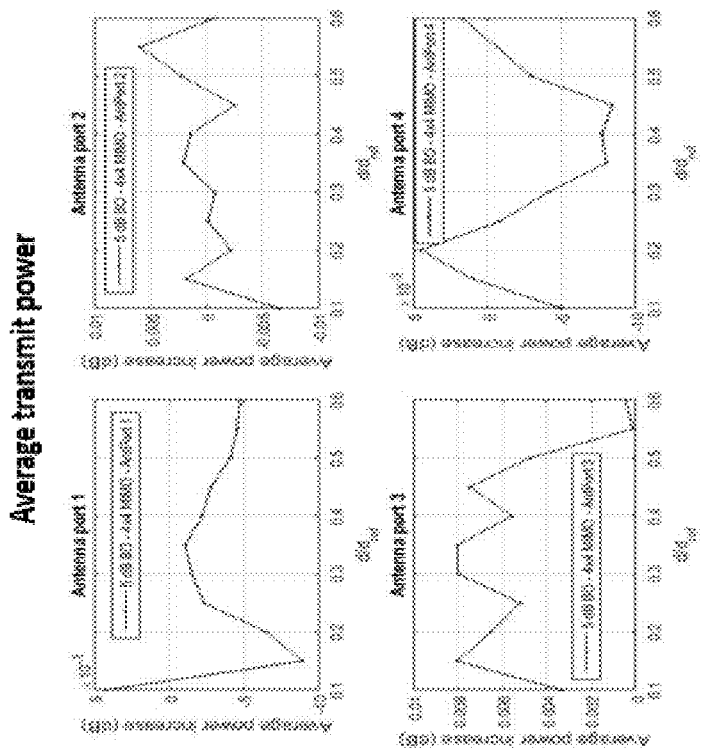
FIGS. 5A, 5B graphically depict peak transmit power and average transmit power, respectively, of a 4×4 MIMO-based system implementing the look-up table function, in accordance with various embodiments of the present disclosure.
Figure 5A:
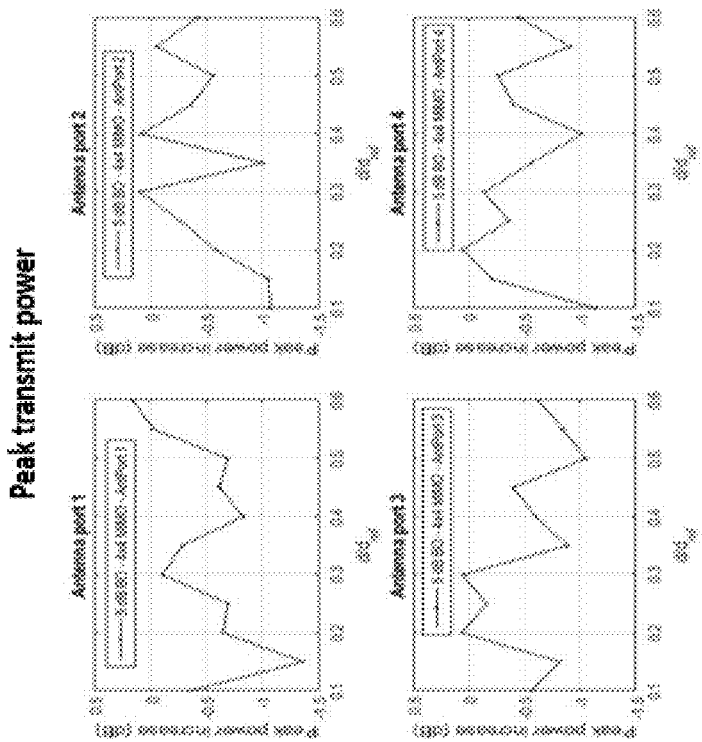
Figures 5C, 5D:
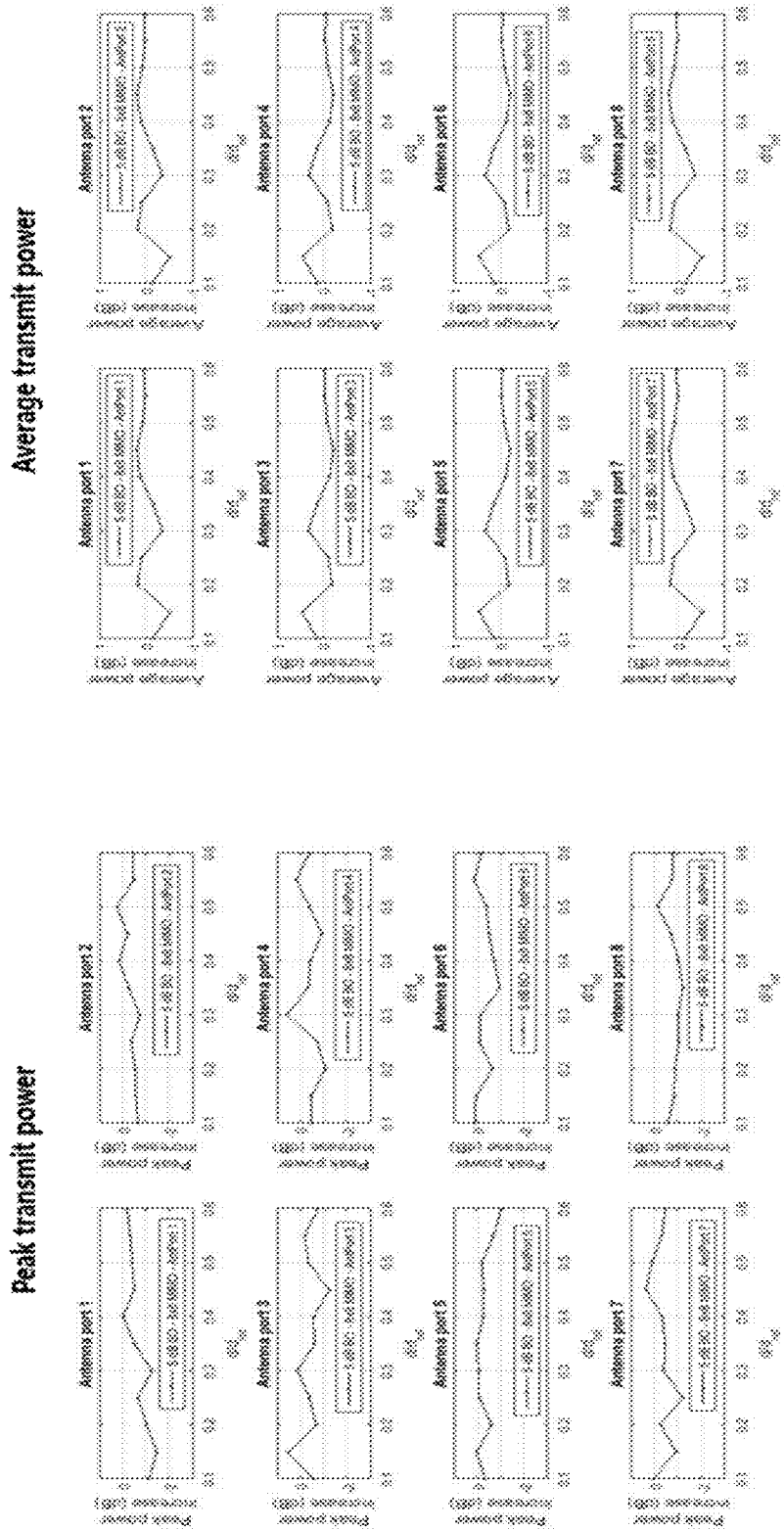
FIGS. 5C, 5D graphically depict peak transmit power and average transmit power, respectively, of an 8×8 MIMO-based system implementing the look-up table function, in accordance with various embodiments of the present disclosure.

In view of the noted spectral efficiency improvements achieved by the disclosed embodiments, the impact on transmit antenna power levels were investigated. To this end, FIGS. 5A, 5B, respectively depict the effects on antenna peak transmit power and average transmit power of implementing look-up function $f_{NON\_CNV}(\underline{p})$ for a 4×4 MIMO-based system employing root raised cosine (RRC) symbol pulse shaping. Similarly, FIGS. 5C, 5D respectively depict the peak transmit power and average transmit power of antenna ports for an 8×8 MIMO-based system employing RRC pulse shaping.

FIGS. 5A-5D demonstrate that, unlike sole conventional SVD coding schemes, the implementation of look-up function $f_{NON\_CNV}(\underline{p})$ to determine the optimal gain values for the 4×4 and 8×8 MIMO-based system scenarios further results in the reduction of peak transmit power levels (as opposed to SVD precoding schemes), without noticeably affecting the average transmit power levels of the system antenna ports.

Figure 6A:
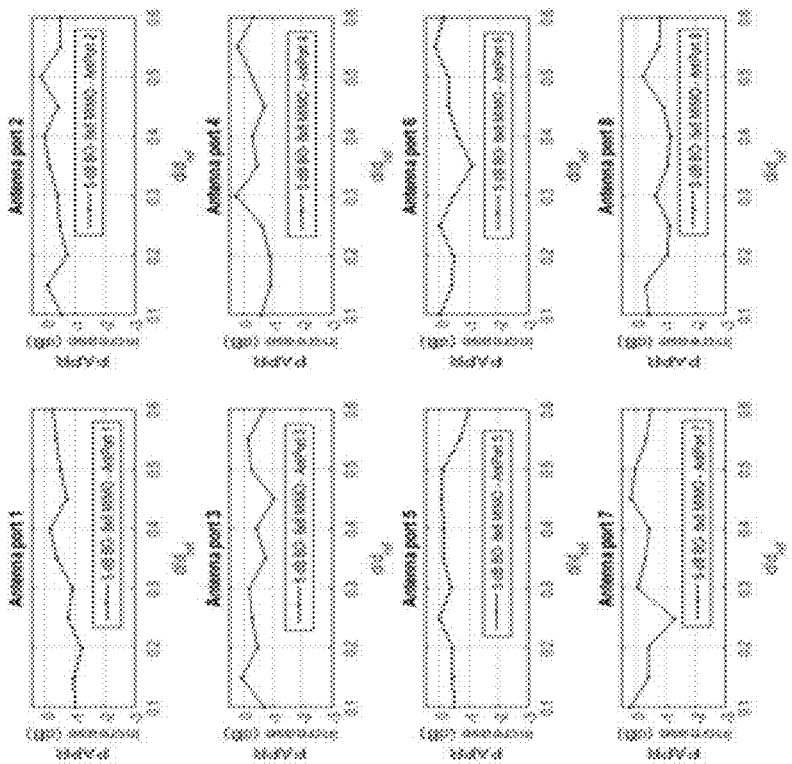
FIGS. 6A, 6B graphically depict peak-to-average transmit power ratio (PAPR) performance of a 4×4 and 8×8 MIMO-based system, respectively, implementing the look-up table function, in accordance with various embodiments of the present disclosure.
Figure 6B:
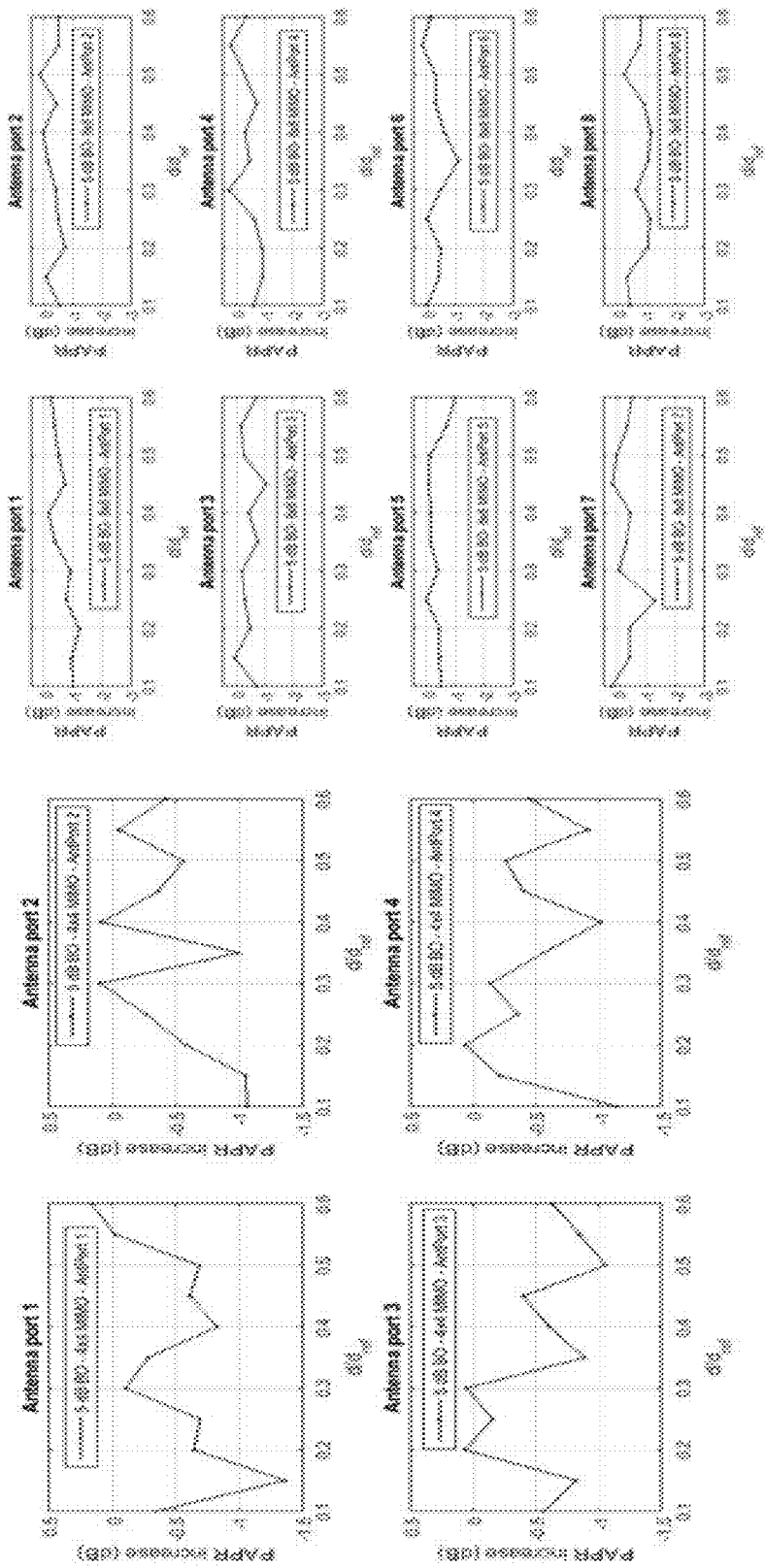

It will be noted that reductions in peak transmit power levels may be expected when lower gain values are assigned to input streams manifesting higher modulation orders, as higher modulation orders typically suggest high peak-to-average power ratios (PAPRs). Hence, FIGS. 6A, 6B respectively illustrate that for the 4×4 and 8×8 MIMO-based system scenarios employing look-up function $f_{NON\_CNV}(\underline{p})$ and RRC pulse shaping, the reduction in the peak transmit power while preserving the average transmit power results in the decrease of PAPR values. Hence, the disclosed embodiments not only achieve significant improvements in the spectral efficiency of 4×4 and 8×8 LoS MIMO-based systems, but also reduce the PAPR for each of the transmitting antenna ports in various scenarios.

Figure 7:
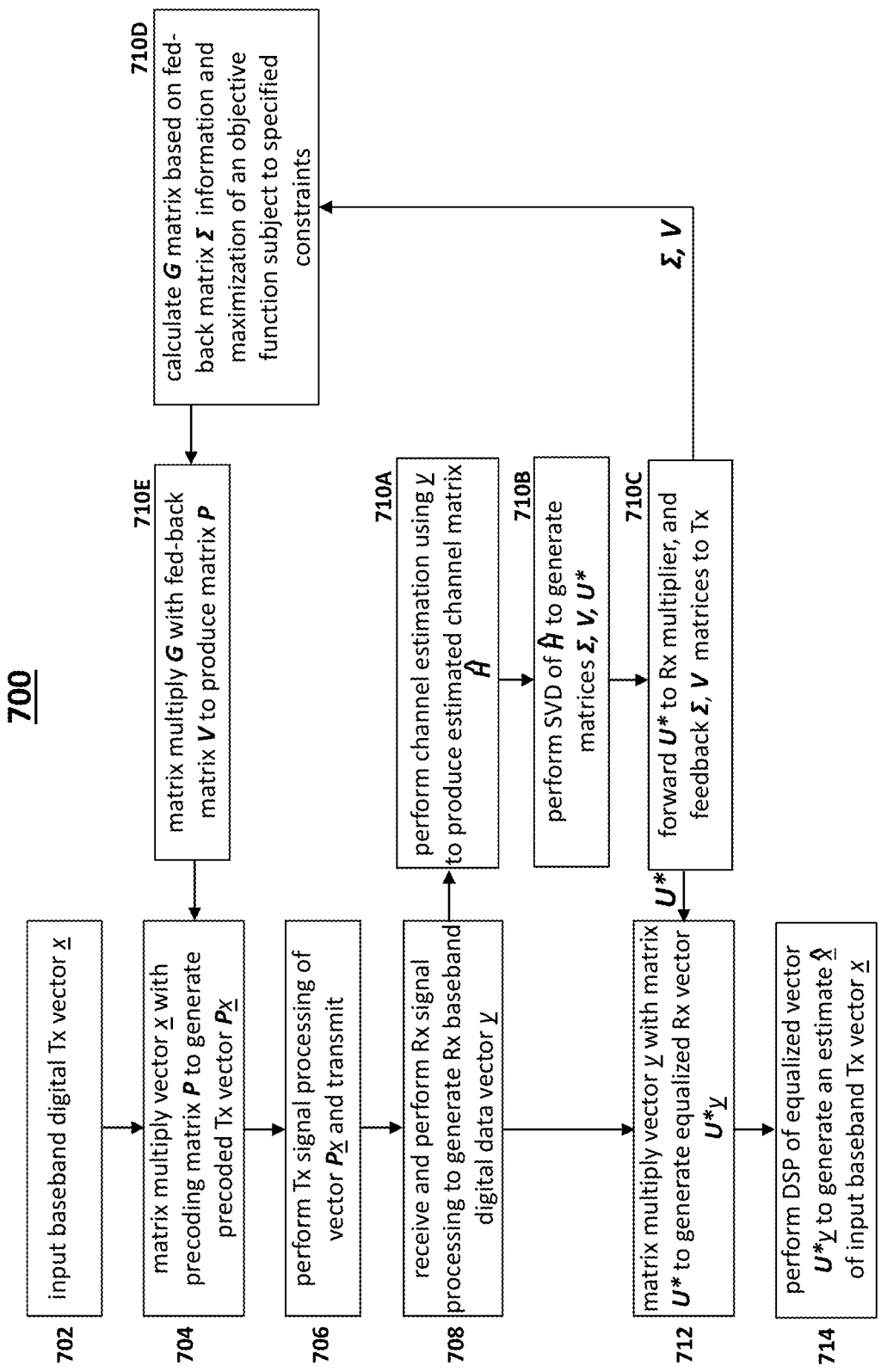
FIG. 7 depicts a functional flow diagram of a process directed to the optimization of the spectral efficiency of a MIMO-based system.

FIG. 7 depicts a functional flow diagram of process 700 directed to the optimization of the spectral efficiency of LoS MIMO-based system 200, in accordance with various embodiments of the present disclosure. As shown, process 700 begins at task block 702, in which a baseband transmit data vector $\underline{x}$ is input to the transmitter unit of system 200 and, at task block 704, vector $\underline{x}$ is matrix-multiplied with precoding matrix P to generate precoded transmit vector P$\underline{x}$. As discussed below, precoding matrix P is the result of the operation of matrix multiplication of unitary matrix V and calculated diagonal matrix G, both of which are based on V and Σ matrix information that is fed-back from the receiver unit.

Process 700 proceeds to task block 706, where precoded transmit vector P$\underline{x}$ is forwarded to a transmitter signal processing unit that performs a variety of transmission-related operations (e.g., digital-to-analog conversion, modulation, frequency up-conversion, filtering, etc.) to radiatively transmit analog signals along the LoS channel path to the receiver.

At task block 708, the transmitted analog signals are received and receiver unit of system 200 performs a variety of receiver-related processes (e.g., frequency down-conversion, demodulation, analog-to-digital conversion, filtering operations, etc.) to generate baseband received data vector $\underline{y}$. The received data vector $\underline{y}$ is forwarded to task block 710A, where an estimated channel matrix $\hat{H}$ is calculated based on received data vector $\underline{y}$.

At task block 710B, an SVD operation is performed on estimated channel matrix $\hat{H}$ to decompose matrix $\hat{H}$ into unitary matrices U, V, and rectangular diagonal matrix Σ containing the singular values of the $\hat{H}$ matrix. And, at task block 710C, the complex conjugate matrix U* is fed-forward to a receiver unit matrix multiplier while the V, Σ matrices are fed-back to the transmitter unit.

With regard to the feed-back path of process 700 providing information of matrices V, Σ to transmitter unit provided by task block 710C, at task block 710D, the G matrix is calculated based on the fed-back information of rectangular matrix Σ that identifies the singular values of the estimated channel matrix $\hat{H}$. The calculation of the G matrix entries is configured to generate optimal gain values that substantially increase the spectral efficiency of system 200. As discussed above, the calculation of the optimal gain values may be achieved by maximizing an objective function $f(\underline{p})$ in view of the constraints limiting the average of the total transmitted power by all antenna elements to be at substantially constant levels and limiting the highest modulation order that can be adequately supported. The objective function $f(\underline{p})$ may take the form of a theoretical mathematical concave function $f_{CNV}(\underline{p})$ or a non-concave lookup table-based function $f_{NON\_CNV}(\underline{p})$ that render optimal gain values through numerical computational methods. In turn, at task block 710E, the G matrix is multiplied with the fed-back unitary matrix V to produce precoding matrix P which, as noted above by task block 704, is multiplied with vector $\underline{x}$ to produce precoded transmit vector P$\underline{x}$.

With regard to the feed-forward path of process 700, at task block 712, the complex conjugate matrix U* provided by task block 710C is matrix-multiplied with received data vector $\underline{y}$ to produce equalized receive vector U*$\underline{y}$. At task block 714, the equalized receive vector U*$\underline{y}$ is subjected to digital signal processing techniques configured to accurately extract an estimated vector $\hat{\underline{x}}$ representative of transmitted baseband digital data vector $\underline{x}$.

Hence, the systems and methods described by the disclosed embodiments are configured to achieve substantial improvements in the spectral efficiency of LoS MIMO-based communications while servicing the highest supportable modulation orders of input data streams and maintaining the average of the total transmitted power at constant levels.

It is to be understood that the operations and functionality of the described wireless receiver architecture, constituent components, and associated processes may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A multi-input multi-output (MIMO) communication system, comprising:
   a transmitter unit including:
      a precoding module configured to multiply an input baseband transmit data vector with a precoding matrix to generate a precoded transmit data vector;
      a gain matrix calculation module operative to generate a gain matrix having optimal gain values that maximize the spectral efficiency of the system based on provided channel information;
      a transmit signal processing unit operative to convert the precoded transmit data vector into an analog signal and transmit the analog signal;
   a receiver unit including:
      a receive signal processing unit operative to receive the transmitted analog signal and convert the received analog signal into a baseband receive data vector;
      an equalization module comprising:
         a channel estimation module configured to estimate the channel information based on the baseband receive data vector and to generate an estimated channel matrix indicative of the channel information, and a singular value decomposition (SVD) module configured to decompose the estimated channel matrix into a first unitary matrix, a second unitary matrix, and a rectangular diagonal matrix having diagonal terms that correspond to the singular values of the estimated channel matrix, wherein, the baseband receive data vector is multiplied with the first unitary matrix to generate an equalized receive vector, the second unitary matrix is fed-back to the precoding module, and the diagonal matrix is fed-back to the gain matrix calculation module;

a digital signal processing unit operative to process the equalized receive vector to generate an estimated data vector representative of the input baseband transmit data vector;

wherein, the gain matrix calculation module is configured to calculate the optimal gain values of the gain matrix by maximizing an objective function encompassing the channel information provided by the fed-back diagonal matrix, and wherein, the gain matrix is multiplied with the fed-back second unitary matrix to produce the precoding matrix.

2. The MIMO communication system of claim 1, wherein the transmitter unit and the receiver unit are arranged to communicate along a line-of-sight (LoS) path.

3. The MIMO communication system of claim 1, wherein the objective function to be maximized that encompasses the channel information to determine optimal gain values is characterized by a concave function, as follows:

$$f_{CNV}(\underline{p}) = \sum_{i=1}^{r} \log_2\left(1 + \frac{\sigma_i^2 p_i}{N}\right),$$

where: $\sigma_i^2$ represents the $i^{th}$ non-zero singular value of the channel matrix; and $$\frac{\sigma_i^2 p_i}{N}$$

represents the signal-to-noise ratio (SNR) of the $i^{th}$ received data stream.

4. The MIMO communication system of claim 3, wherein constant values related to the minimum SNR of a received data stream required to support the highest modulation order is characterized as follows:

$$C_i = (2^B - 1)\frac{N}{\sigma_i^2},$$

where: B represents the number of bits per symbol for the highest supported modulation order.

5. The MIMO communication system of claim 4, wherein the maximizing of the objective function that encompasses the channel information to calculate optimal gain values is determined in accordance with constraints that limit the average of the total transmit power, limit the SNR of a received data stream to the minimum SNR required to support the highest modulation order, and limit the gain values to non-negative values.

6. The MIMO communication system of claim 5, wherein the maximizing of the objective function to calculate the optimal gain values is determined through numerical computational methods.

7. The MIMO communication system of claim 1, wherein the objective function to be maximized that encompasses the channel information to determine optimal gain values is characterized by a look-up table (LUT) function, as follows:

$$f_{NON\_CNV}(\underline{p}) = \sum_{i=1}^{r} f_{LUT}\left(\frac{\sigma_i^2 p_i}{N}\right),$$

where:

$$f_{LUT}\left(\frac{\sigma_i^2 p_i}{N}\right)$$

represents the LUT function providing predefined spectral efficiency values in accordance with signal-to-noise ratio (SNR) values; and $$\frac{\sigma_i^2 p_i}{N}$$

represents the SNR value of the $i^{th}$ received data stream.

8. The MIMO communication system of claim 7, wherein constant values related to the minimum SNR of a received data stream required to support the highest modulation order is characterized as follows:

$$C_i = 10^{K/10}\frac{N}{\sigma_i^2},$$

where: K represents the minimum SNR value (in dB) necessary to achieve the maximum spectral efficiency calculated based on the LUT function $f_{LUT}(.)$, including SNR back-off (BO) values; and $$\left(\frac{\sigma_i^2 C_i}{N}\right)$$

represents the maximum limit of SNR value for the $i^{th}$ received data stream.

9. The MIMO communication system of claim 8, wherein the maximizing of the objective function that encompasses the channel information to calculate optimal gain values is determined in accordance with constraints that limit the average of the total transmit power, limit the SNR of a received data stream to the minimum SNR required to support the highest modulation order, and limit the gain values to non-negative values.

10. The MIMO communication system of claim 9, wherein the maximizing of the objective function that encompasses the channel information to determine optimal gain values is determined through numerical computational methods.

11. A method for communicating information over a multi-input multi-output (MIMO) system, comprising:
at a transmitting unit:
multiplying, via a precoding module, an input baseband transmit data vector with a precoding matrix to generate a precoded transmit data vector;
generating, via a gain matrix calculation module, a gain matrix having optimal gain values based on provided channel information;
converting the precoded transmit data vector into an analog signal and transmitting the analog signal;
at a receiving unit:
receiving the transmitted analog signal and converting the received analog signal into a baseband receive data vector;
performing equalization processing on the baseband receive data vector comprising:
estimating the channel information based on the baseband receive data vector and generating an estimated channel matrix indicative of the channel information,
applying singular value decomposition (SVD) operations to decompose the estimated channel matrix into a first unitary matrix, a second unitary matrix, and a rectangular diagonal matrix having diagonal terms that correspond to the singular values of the estimated channel matrix,
multiplying the baseband receive data vector with the first unitary matrix to generate an equalized receive vector, feeding-back the second unitary matrix to the precoding module, and feeding-back the diagonal matrix to the gain matrix calculation module;
a digital signal processing unit operative to process the equalized receive vector to generate an estimated data vector representative of the input baseband transmit data vector;
wherein, the gain matrix calculation module is configured to calculate the optimal gain values of the gain matrix by maximizing an objective function encompassing the channel information provided by the fed-back diagonal matrix, and
wherein, the gain matrix is multiplied with the fed-back second unitary matrix to produce the precoding matrix.

12. The MIMO communication method of claim 11, wherein the transmitting unit and the receiving unit are arranged to communicate along a line-of-sight (LoS) path.

13. The MIMO communication method of claim 11, wherein the objective function to be maximized that encompasses the channel information to determine optimal gain values is characterized by a concave function, as follows:

$$f_{CNV}(\underline{p}) = \sum_{i=1}^{r} \log_2\left(1 + \frac{\sigma_i^2 p_i}{N}\right),$$

where: $\sigma_i^2$ represents the $i^{th}$ non-zero singular value of the channel matrix; and $$\frac{\sigma_i^2 p_i}{N}$$

represents the signal-to-noise ratio (SNR) of the $i^{th}$ received data stream.

14. The MIMO communication method of claim 13, wherein constant values related to the minimum SNR of a received data stream required to support the highest modulation order is characterized as follows:

$$C_i = (2^B - 1)\frac{N}{\sigma_i^2},$$

where: B represents the number of bits per symbol for the highest supported modulation order.

15. The MIMO communication method of claim 14, wherein the maximizing of the objective function that encompasses the channel information to calculate optimal gain values is determined in accordance with constraints that limit the average of the total transmit power, limit the SNR of a received data stream to the minimum SNR required to support the highest modulation order, and limit the gain values to non-zero values.

16. The MIMO communication method of claim 15, wherein the maximizing of the objective function to calculate the optimal gain values is determined through numerical computational methods.

17. The MIMO communication system of claim 11, wherein the objective function to be maximized that encompasses the channel information to determine optimal gain values is characterized by a look-up table (LUT) function, as follows:

$$f_{NON\_CNV}(\underline{p}) = \sum_{i=1}^{r} f_{LUT}\left(\frac{\sigma_i^2 p_i}{N}\right),$$

where:

$$f_{LUT}\left(\frac{\sigma_i^2 p_i}{N}\right)$$

represents the LUT function providing predefined spectral efficiency values in accordance with signal-to-noise ratio (SNR) values; and $$\frac{\sigma_i^2 p_i}{N}$$

represents SNR value of the $i^{th}$ received data stream.

18. The MIMO communication method of claim 17, wherein constant values related to the minimum SNR of a received data stream required to support the highest modulation order is characterized as follows:

$$C_i = 10^{K/10} \frac{N}{\sigma_i^2},$$

where: K represents the minimum SNR value (in dB) necessary to achieve the maximum spectral efficiency calculated based on the LUT function $f_{LUT}(.)$, including SNR back-off (BO) values; and $$\left(\frac{\sigma_i^2 C_i}{N}\right)$$

represents the maximum limit of SNR value for the $i^{th}$ received data stream.

19. The MIMO communication method of claim 18, wherein the maximizing of the objective function that encompasses the channel information to calculate optimal gain values is determined in accordance with constraints that limit the average of the total transmit power, limit the SNR of a received data stream to the minimum SNR required to support the highest modulation order, and limit the gain values to non-zero values.

20. The MIMO communication method of claim 19 wherein the maximizing of the objective function that encompasses the channel information to determine optimal gain values is determined through numerical computational methods.

* * * * *